(12) United States Patent
Liou et al.

(10) Patent No.: US 7,781,491 B2
(45) Date of Patent: Aug. 24, 2010

(54) CATIONIC EXCHANGE RESIN WITH ZERO-VALANCE DOUBLE METAL CATIONIC EXCHANGE RESIN AND PROCESS THEREOF

(76) Inventors: Ya-Hsuan Liou, 2F., No. 45, Lane 32, Syuefu Rd., Danshuei Township, Taipei County (TW); Shang-Lien Lo, 7F., No. 7, Lane 58, Wen Chou St., Ta An Dist., Taipei City (TW); Chin-Jung Lin, No. 424, Sec. 2, Cijia Rd., Cishan Township, Kaohsiung County (TW)

( * ) Notice: Subject to any disclaimer, the term of this patent is extended or adjusted under 35 U.S.C. 154(b) by 404 days.

(21) Appl. No.: 11/907,842

(22) Filed: Oct. 18, 2007

(65) Prior Publication Data
US 2008/0119575 A1 May 22, 2008

(30) Foreign Application Priority Data
Nov. 17, 2006 (TW) .............................. 95142639 A

(51) Int. Cl.
*B01J 39/18* (2006.01)
(52) U.S. Cl. ............ 521/25; 423/594.9; 423/618; 423/604
(58) Field of Classification Search ............... 521/25; 423/594.9, 618, 604
See application file for complete search history.

(56) References Cited

U.S. PATENT DOCUMENTS 2,861,045 A * 11/1958 Langer, Jr. .................. 502/159
5,798,055 A * 8/1998 Blinka et al. ........... 252/188.28

* cited by examiner

*Primary Examiner*—Ling-Siu Choi
*Assistant Examiner*—Michael M Bernshteyn
(74) *Attorney, Agent, or Firm*—Rosenberg, Klein & Lee

(57) ABSTRACT

A process of doping zero-valance double metals into a cationic exchange resin to increase reactive activity of zero-valance metals includes providing a cationic exchange resin to contact a first metal in the form of ions to reduce the first metal which then attaches to the cationic exchange resin; providing a second metal in the form of ions to contact and attach to the first metal; and reducing the second metal to zero valance and forming a carrier containing double metals. The cationic exchange resin is selected from a strong acidic ion exchange resin of which the ion exchange functional group is $SO_3Na$ and $SO_3H$. The first metal is selected from the noble metal group: palladium, platinum and copper. The second metal is selected from the normal metals group, such as tin. The first metal and the second metal respectively have particle diameters ranging from 20 to 100 nm.

3 Claims, 8 Drawing Sheets

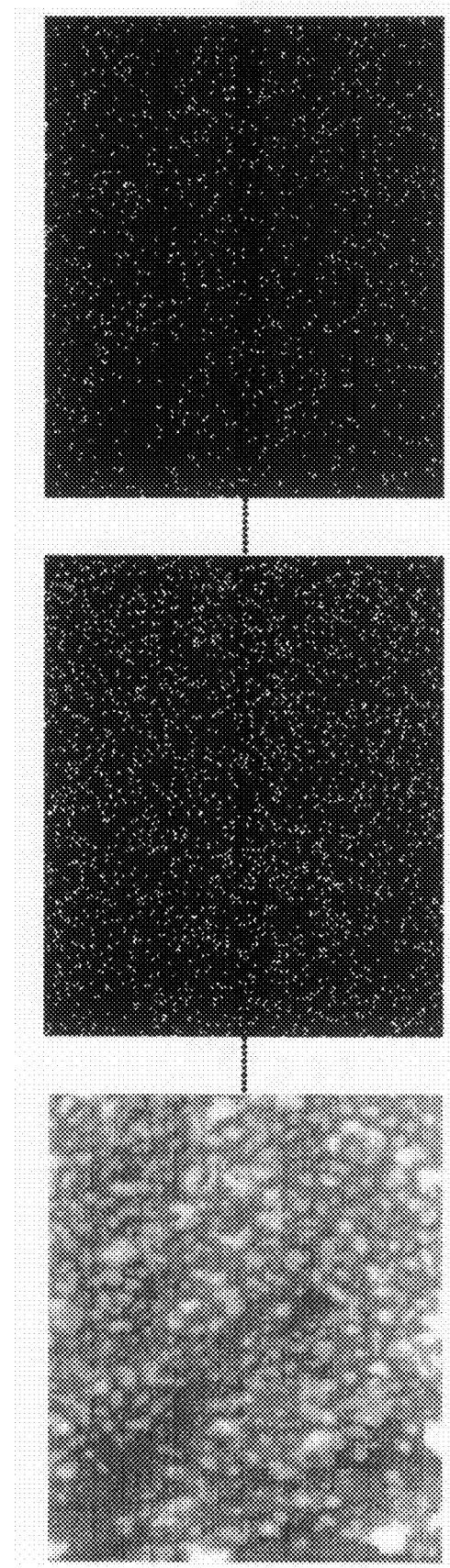

CATIONIC EXCHANGE RESIN WITH ZERO-VALANCE DOUBLE METAL CATIONIC EXCHANGE RESIN AND PROCESS THEREOF

BACKGROUND OF THE INVENTION

1. Field of the Invention

The invention generally relates to a process of preparing a substance which can degrade chlorine-containing organic pollutants, and more particularly to a process that increases the reactive activity for zero-valance metal and degrades chlorine-containing organic pollutants.

2. Description of the Related Art

As the world's population increases, pollutants or waste generated from human activity have greatly affected our living environment, and thus approaches to solve such pollution problems have attracted more and more attention.

For chlorine-containing organic solvents such as carbon tetrachloride and ethylene trichloride, if they are intentionally discarded or spread over a groundwater system, they tend to accumulate in an organic layer in earth or gradually move downward to an impermeable layer at a bottom of the groundwater system, or even penetrate through voids of the impermeable layer. Such chlorine-containing organic solvents have low dissolubility in water and cannot be easily decomposed. They are gradually released in a groundwater system over decades or even hundred years. Most chlorine-containing organic solvents are toxic to living things and have bio-accumulation. Carbon tetrachloride and ethylene tetrachloride are both carcinogenic. Even though chlorine-containing organic solvents have low dissolution in water, the content thereof is thousands or tens of thousands times more than what is contained in drinking water. For example, ethylene trichloride has a dissolution of 1100 mg/l at 25 C, while the standard used to evaluate drinking water is 0.005 mg/l.

It is known that zero-valance metals such as zero-valance iron $Fe^0$ can be involved in natural de-chlorination of chlorine-containing organics. Most chlorine-containing organics can be degraded to non-toxic hydrocarbons or carbon dioxide. For passive treatment of a groundwater system polluted by chlorine-containing organics, a permeable reactive barrier (PRB) filled with the zero-valance metal and located downstream of polluted groundwater is more economical than pumping and treatment systems commonly used in terms of operation, management and cost.

It is reported that increasing the reactive activity of zero-valance metal can is greatly reduce the thickness of PRBs, further lowering construction and material costs. Small amounts of noble metals such as palladium, platinum and copper are clad over the zero-valance metals to greatly increase reactive activity. It is proven that catalyzation of the noble metals accelerate reducing degradation of pollutants at a reaction rate ten times greater than conventional methods.

Conventionally, there are two ways to increase reactive activity. One of them is shown in FIG. 1A, in which the first metal 12 in the form of noble metal powders is mixed with zero-valance iron metal 10 at a certain ratio. The mixture is then filled into the reactive barrier. The second method is shown in FIG. 1B, in which a first metal 18 such as palladium is coated over the zero-valance iron metal 16 via electrochemical replacement. The chemical formula used is as follows:

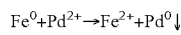

$Fe^0 + Pd^{2+} \rightarrow Fe^{2+} + Pd^0 \downarrow$

The first method needs a lot of metal and the metal used is easily lost, which is not highly economically efficient. In the second method, the noble metal tends to peel off from the iron surface or become inactive due to the oxidization of the iron metal.

Therefore, there is a need for a process of reductively degrading pollutants using zero-valance metal.

SUMMARY OF THE INVENTION

It is an object of the invention to provide a process for preparing a zero-valance double metal cationic exchange resin. Use of reductively degrading the cationic exchange resin according to the invention offers the following advantages:

1. After the particle diameter of the noble metal is reduced to a nanometer level, the surface area relative to the total number of atoms can be greatly increased so that the amount of metal joining the heterogenerous surface reaction is close to the stoichiometric number. It provides improved economic competitiveness.

2. Use of noble metals such as palladium and reducing agents such as tin can be completely reacted.

3. The amount of noble metals such as palladium and the corresponding mount of reducing agents such as tin can be precisely controlled.

4. The use of resin as a carrier reduces the loss of noble metals for the purpose of maintaining catalyzation ability and lowering costs.

A process of doping zero-valance double metals into a cationic exchange resin to increase the reactive activity of zero-valance metals according to the invention includes the following steps: providing a cationic exchange resin to contact a first metal in the form of ions to reduce the first metal which then attaches to the cationic exchange resin; providing a second metal in the form of ions to contact and then attach to the first metal; and reducing the second metal to zero valance and forming a carrier containing double metals.

The cationic exchange resin is selected from a strong acidic ion exchange resin of which the ion exchange functional group is selected from $SO_3Na$ and $SO_3H$. The first metal is selected from the group consisting of noble metal palladium, platinum and copper. The second metal is selected from the group consisting of normal metals such as tin. Particle diameters of the first metal and the second metal respectively are ranging from 20 to 100 nm.

The reactive activity of zero-valance iron metal is increased by means of mixing zero-valance double metal cationic exchange resin with zero-valance iron metal. When the mixture is filled in the reactive barrier, the amounts of noble metal and the reducing agent are reduced and thus the thickness of the reactive barrier is greatly reduced. Furthermore, due to the use of the cationic exchange resin to absorb the nano-sized noble metal and the reducing agent, the ratio of cationic exchange resin relative to the total number of atoms effectively increases and noble metal loss is reduced, which further lowers construction and material costs.

To provide a further understanding of the invention, the following detailed description illustrates embodiments and examples of the invention, this detailed description being provided only for illustration of the invention.

BRIEF DESCRIPTION OF THE DRAWINGS

FIG. 3A is an electro-microscopic photo of a cationic exchange resin with zero-valance palladium/tin double metals according to one preferred embodiment of the invention at amplification factor of 30,000;

FIG. 3B is a graph of tin element analysis in FIG. 3A;

FIG. 3C is a graph of palladium element analysis in FIG. 3A;

DETAILED DESCRIPTION OF THE EMBODIMENTS

Figure 1A:
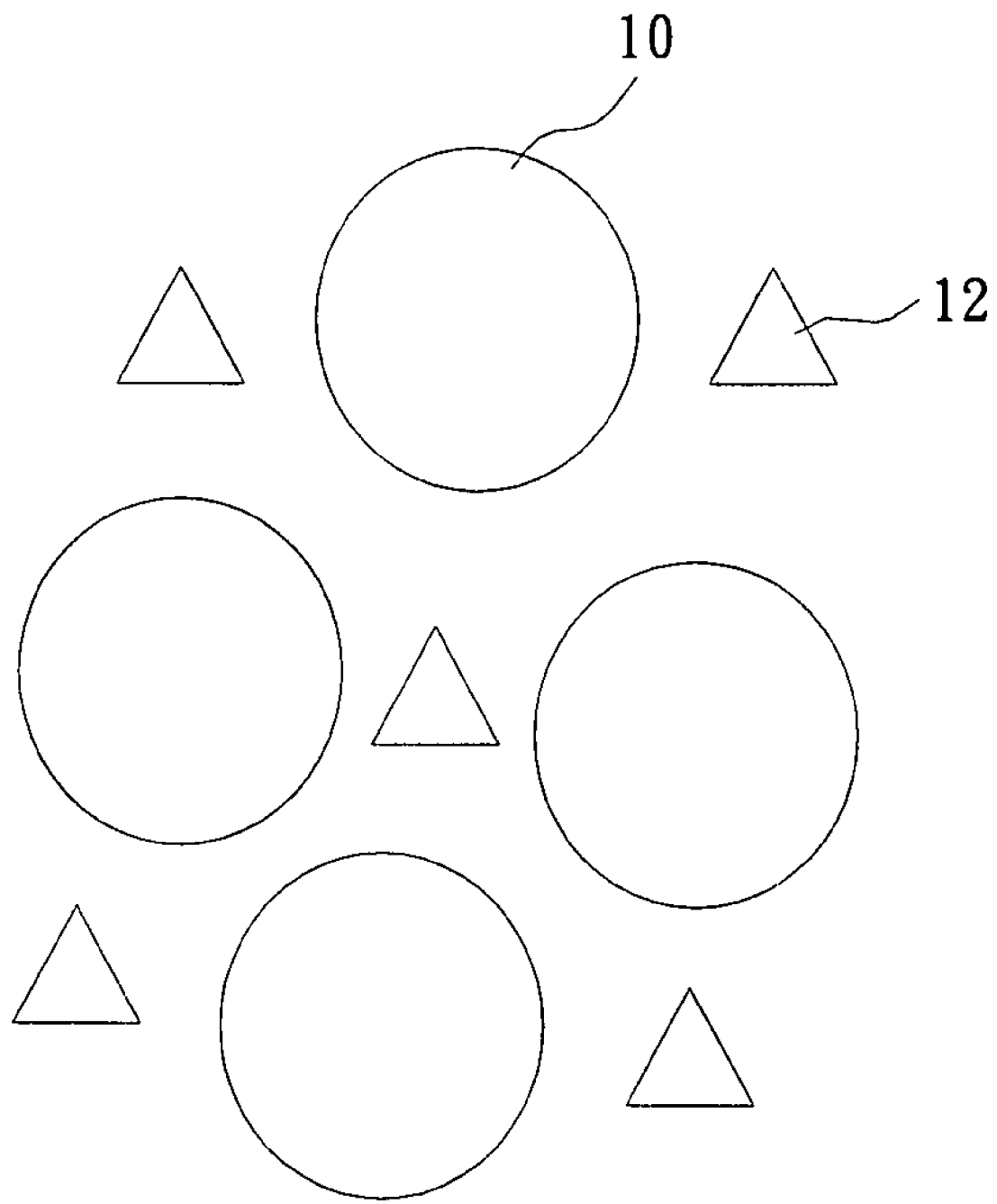
FIG. 1A is a schematic view showing the noble metal powders mixed with iron powders to increase the reactive activity of the zero-valance metal in prior art.
Figure 1B:
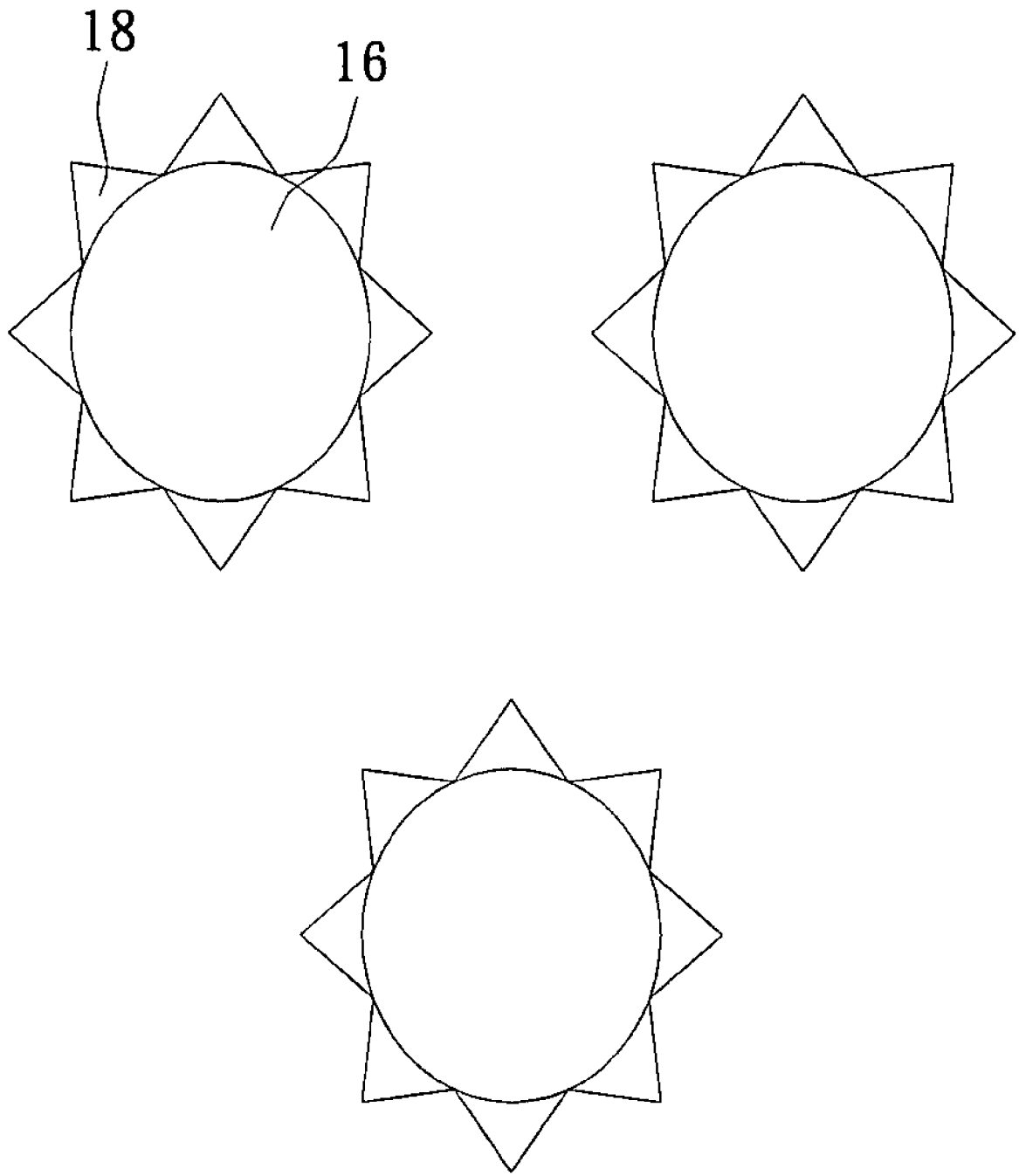
FIG. 1B is a schematic view showing a noble metal layer electrochemically coated on the iron metal to increase the reactive activity of the zero-valance metal in prior art.

Wherever possible in the following description, like reference numerals will refer to like elements and parts unless otherwise illustrated.

In one preferred embodiment, the first metal is palladium and the second metal is tin. The cationic exchange resin is strong acidic ion exchange resin. A flowchart of a process of preparing the zero-valance double cationic exchange resin according to this preferred embodiment is shown in FIG. 2A.

Uniform Absorption of First Metal-Palladium onto the Cationic Exchange Resin

Figure 2A:
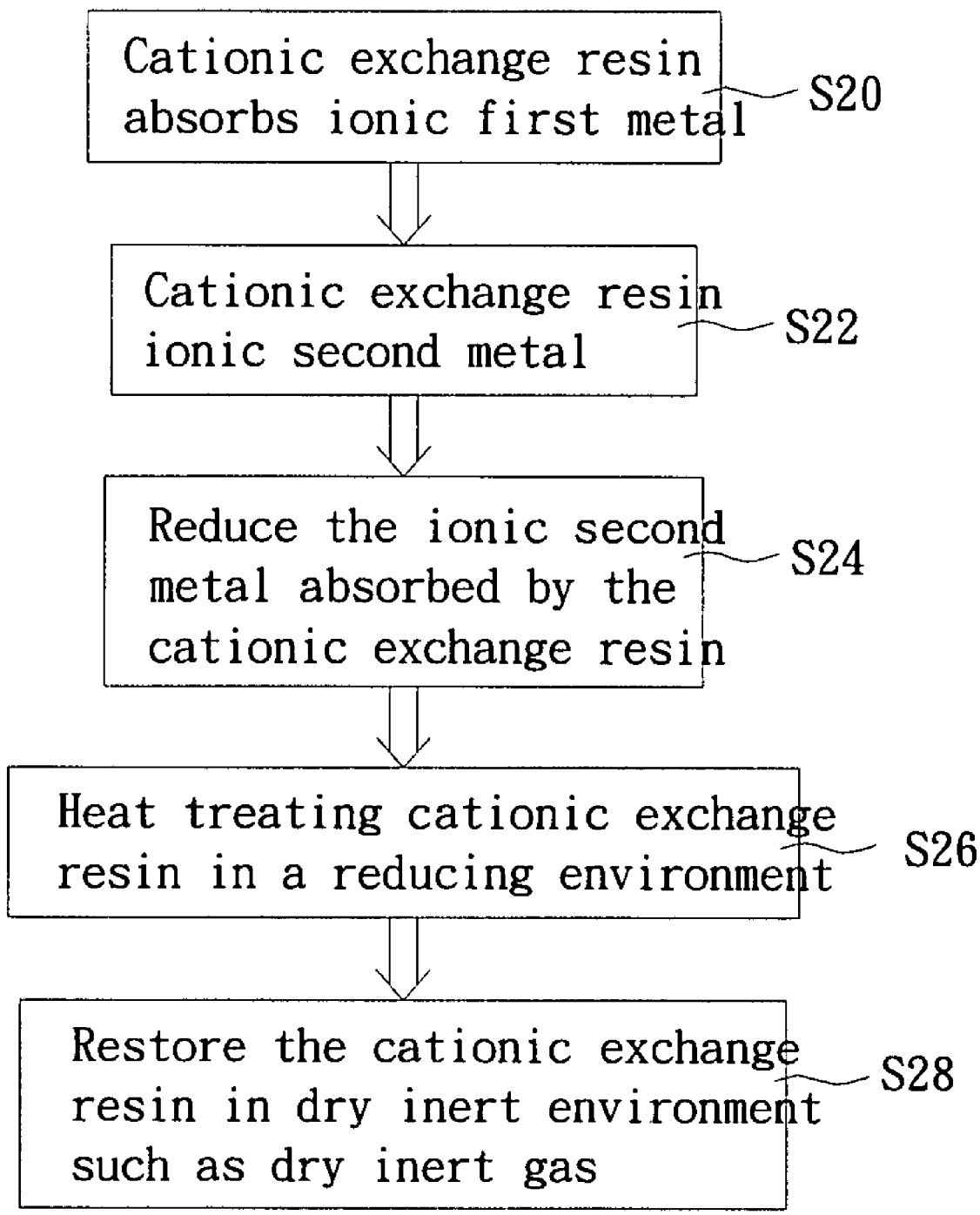
FIG. 2A is a flowchart showing a process of doping zero-valance double metal in the cationic exchange resin according to the invention.

Referring to S20 in FIG. 2A, 10 ml of Pd $(NO_3)_2 \cdot H_2O$ is dissolved 50 ml of steamed water in (concentration: about 1000 mg-Pt/l) and the solution is heated to 70-80 C. 10 ml of ammonia (25%) is then added to make the solution change from a yellow color to colorless and form $[Pd (NO_3)_4]^{2+}$ positive valance complex ions. The solution is then cooled to room temperature. Next, 10 g of strong acidic ion exchange resin is added into the solution to absorb the positive valance complex ions for 30 minutes. Ion exchange functional groups in the above strong acidic ion exchange resin are selected from either $SO_3Na$ or $SO_3H$. Titration reduction is conducted using 1.5N $NaBH_4$. Overnight drying at 105 C is performed and the solution is then heated in a tube-shaped oven to 250 C ($N_2:H_2=4:1$, 50 ml/min) for 60 minutes.

Absorption of Second Metal-Tin in Ion State

Referring to S22, a loaded metal is calculated to be 20 mg/g resin. A second metal source—a solution having tin ions are diluted to a reaction concentration of 100-200 mg-$Sn^{2+}$/l. After 10 g of resin is added, absorption is conducted for 30-40 minutes. The absorption ability is about 96%. A carrier with double metals is formed after the absorption is completed. Subsequently, separation is performed. Steamed water rises off tin ions which are additionally physically absorbed, and then cationic exchange resin is removed by means of a suction device.

Reduction of Tin Ions to Zero-valence Tin

The cationic exchange resin (10 g) absorbing the above-mentioned metal ions is stored in a 50 ml container filled with ethanol in order to avoid the reducing agent being consumed due to hydrolysis or from oxidization due to oxygen in water (the reducing ability of ethanol). Referring to S24, 1.5N $NaBH_4$ is titrated (i.e. slowly dropped in) for reduction reaction while stirring. The exchange resin is kept still for 30-40 minutes and then exposed to dry in an environment full of an inert gas, for example nitrogen.

Thermal Treatment

Referring to S26, the reduced double metal cationic exchange resin is removed from the ethanol. The remaining ethanol in the resin evaporates out naturally in 10 minutes. Next, the resin is heated in a reductive gas at 150 C for 30 minutes so that the above double metals are slightly embedded into the resin and thus fixed to the resin.

Preservation

Referring to S28, the double metal cationic exchange resin is preserved in an anhydrous inert gas, such as helium or argon because the zero-valence metal diameter is at nano-level and is highly active.

Figure 2B:
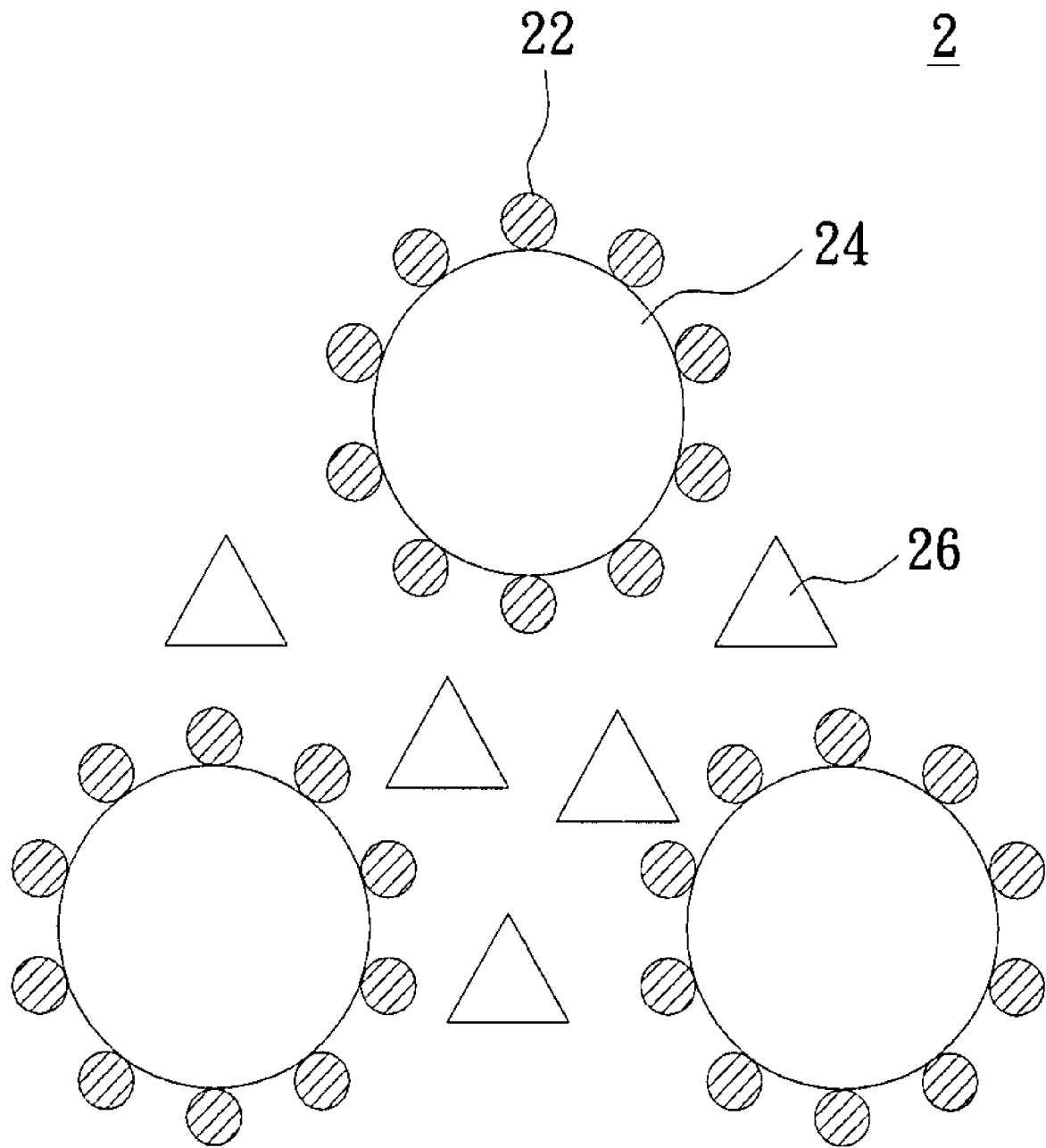
FIG. 2B is a schematic view of a cationic exchange resin with zero-valance metals according to the invention.

FIG. 2B is a schematic view of a cationic exchange resin with zero-valence palladium/tin double metals obtained from the above steps. The first metal 22 (palladium) is absorbed onto the selected cationic exchange resin 24 (strong acidic ion exchange resin). The second metal 26 (tin) is loaded between the first metal and the exchange resin to form a carrier 2 which is a cationic exchange resin containing the zero-valance palladium/tin double metals). The cationic exchange resin used in the invention loads the first metal (noble metal palladium) as a catalyst and the second metal (tin) as a reductive agent onto the cationic exchange resin. By means of the limited attraction (between positive and negative charges) offered by the cationic exchange resin when the noble metal precursor is reduced to zero valance, the particle size of the noble metal is controlled to increase a specific surface area thereof, resulting in the amount of metals involved in heterogeneous surface reaction being much close to the stoichiometric number. With the use of adhesion between the cationic exchange resin and the noble metal, the loss of the noble metal can be avoided.

FIG. 3A is a photo taken by an electronic microscope, showing a cationic exchange resin with zero-valance palladium/tin double metals using an amplification factor of 30,000. A scanning electronic microscope is used to observe an appearance of a composite formed of the cationic exchange resin, the first metal (noble metal palladium) and the second metal (tin). FIG. 3A and FIG. 3C respectively show element analysis graphs of the element tin and the element palladium. Using an element analysis device to observe the appearance of the composite, it is noted that the element tin and the element palladium have metal particle sizes of between 20-100 nm and uniform particle distribution.

Figure 4A:
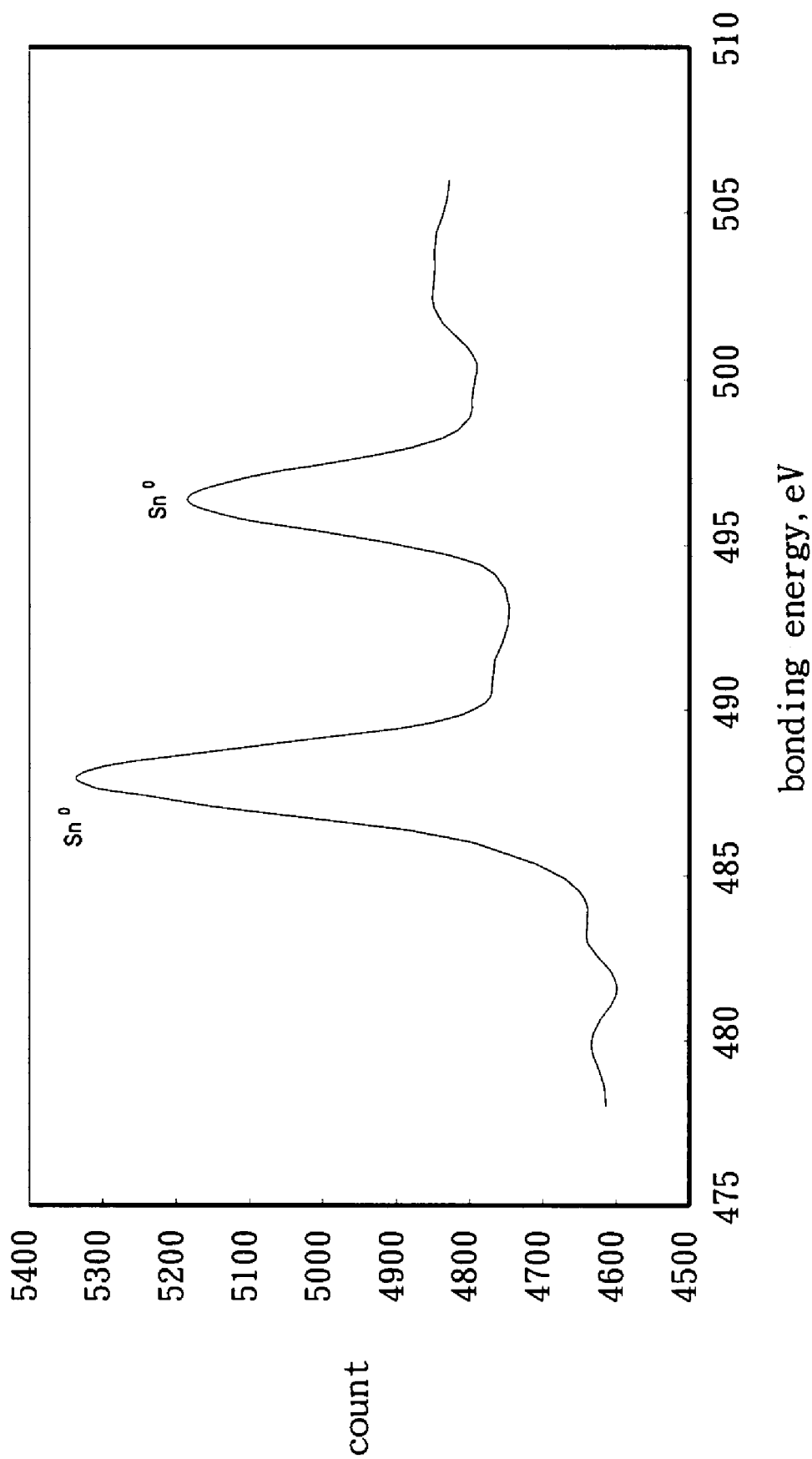
FIG. 4A is an X-ray photo-electron energy graph of tin in the cationic exchange resin with double metals according to one preferred embodiment of the invention.
Figure 4B:
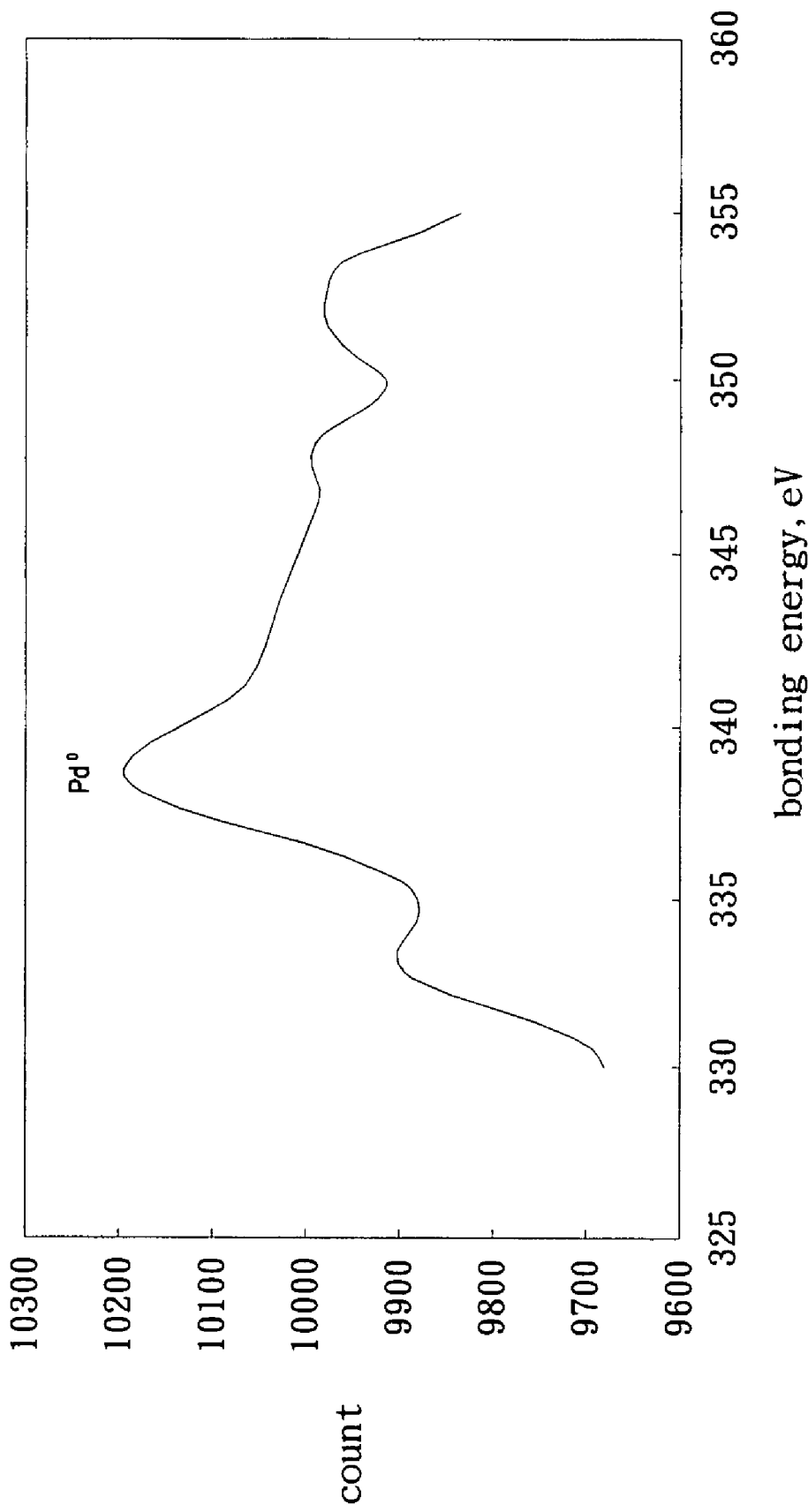
FIG. 4B is an X-ray photo-electron energy graph of palladium in the cationic exchange resin with double metals according to one preferred embodiment of the invention.

FIG. 4A and FIG. 4B respectively show X-ray photo-electron energy graphs for tin and palladium in the double metal cationic exchange resin. In FIG. 4A, two peaks indicating the presence of zero-valance tin appear in two regions of 485-490 electron voltage (eV) and 495-500 eV, respectively. In FIG. 4B, one peak indicating the presence of zero-valance palladium appear in the region of 335-340 eV. FIG. 4 shows the process according to the present invention completely reduces palladium and tin to zero valances, so that the cationic exchange resin has a high capability of increasing reactive activity for zero-valance iron metal.

Figure 5:
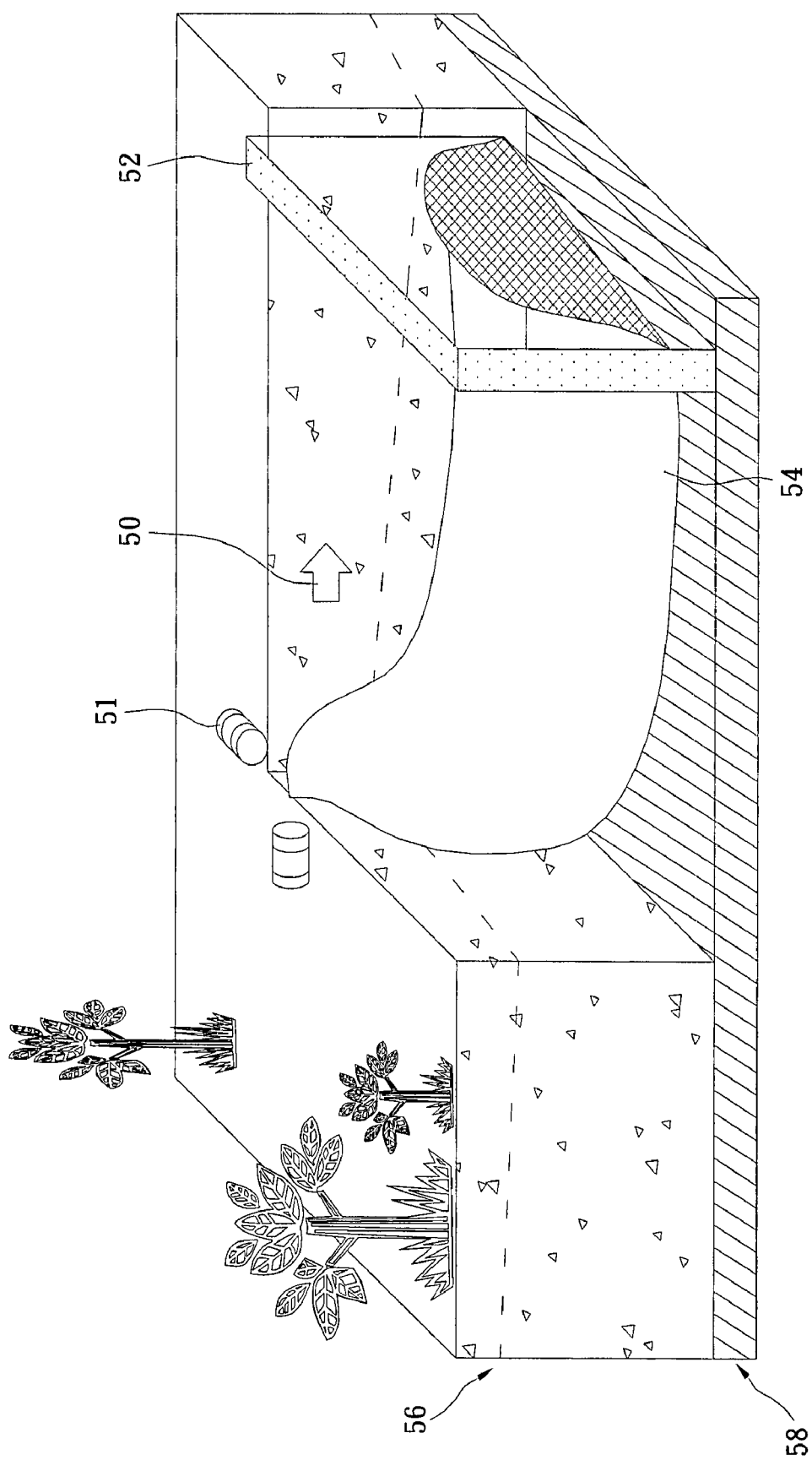
FIG. 5 is a schematic view of a cationic exchange resin with double metals applied to a permeable reactive barrier according to one preferred embodiment of the invention.

FIG. 5 is a schematic view of a permeable reactive barrier where the cationic exchange resin is applied according to one preferred embodiment of the invention. A pollution source 51, such as a chlorine-containing organic solvent, is discarded or unintentionally drained into the earth. When the pollution source 51 flows along the direction 50 of groundwater flow to spread over the groundwater and form a pollution tongue 54, it tends to be absorbed in an organic layer in the earth or gradually move downward through a groundwater level 56, further reaching a clay layer 58 and an impermeable layer at a bottom of the groundwater system. The above chlorine-containing organic solvent has low dissolubility in water, is not easily decomposed, and is gradually released into the groundwater system.

A permeable reactive barrier filled with the zero-valance double metal cationic exchange resin and zero-valance metal (not shown) according to the invention is mounted downstream of the pollution tongue 54 to reduce and degrade pollutants. The particle diameter of the noble metal used in the invention can be further subjected to miniature to nano-level to increase its total surface area, so that the noble metal, such as palladium, and the reducing agent, such as tin, can be completely reduced and the relative amount of the noble metal and the reducing agent can be precisely controlled. In addition, the use of the double metal cationic exchange resin according to the invention can effectively prevent the loss of the noble metal. Therefore, it greatly reduces the treatment cost regarding environmental protection concerns, while providing excellent capabilities for pollutant catalysis and degradation.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A cationic exchange resin with zero-valance double metals is used to increase the reactive activity of zero-valance metals, the cationic exchange resin comprising:
   a cationic exchange resin;
   a first metal, in a reduced state and attached to the cationic exchange resin; and
   a second metal, in a zero-valance state and attached to the first metal to form a carrier with double metals; wherein the cationic exchange resin is selected from a strong acidic ion exchange resin of which the ion exchange functional group is selected from $SO_3Na$ and $SO_3H$, and particle diameters of the first metal and the second metal are respectively ranging from 20 to 100 nm.

2. The cationic exchange resin of claim 1, wherein the first metal is selected from the group consisting of noble metal palladium, platinum and copper.

3. The cationic exchange resin of claim 1, wherein the second metal is tin.

* * * * *